US007302427B2

(12) United States Patent
Morikawa et al.

(10) Patent No.: US 7,302,427 B2
(45) Date of Patent: Nov. 27, 2007

(54) TEXT MINING SERVER AND PROGRAM

(75) Inventors: Yuji Morikawa, Tokyo (JP); Tadashi Mizunuma, Tokyo (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 340 days.

(21) Appl. No.: 11/203,305

(22) Filed: Aug. 15, 2005

(65) Prior Publication Data

US 2006/0069673 A1 Mar. 30, 2006

(30) Foreign Application Priority Data

Sep. 29, 2004 (JP) ............................ 2004-284601

(51) Int. Cl.
*G06F 17/30* (2006.01)

(52) U.S. Cl. ........................ 707/5; 707/1; 707/2; 707/4

(58) Field of Classification Search ................ 707/1–7, 707/10, 100, 101, 102, 200, 205; 704/10; 715/532

See application file for complete search history.

(56) References Cited

U.S. PATENT DOCUMENTS 5,890,151 A * 3/1999 Agrawal et al. ............... 707/5
6,006,223 A * 12/1999 Agrawal et al. ............... 707/5
6,212,494 B1 * 4/2001 Boguraev ...................... 704/9
6,571,243 B2 * 5/2003 Gupta et al. .................... 707/6
6,920,448 B2 * 7/2005 Kincaid et al. ................ 707/3
2005/0256766 A1 * 11/2005 Garcia et al. ................. 705/14

* cited by examiner

*Primary Examiner*—Wilson Lee
*Assistant Examiner*—Marcin Filipczyk
(74) *Attorney, Agent, or Firm*—Reed Smith LLP; Stanley P. Fisher, Esq.; Juan Carlos A. Marquez, Esq.

(57) ABSTRACT

In the preparation of a characteristic word list as one method of text mining, means for selecting an unnecessary word group that requires to be removed in advance is provided. Document IDs and a user ID are received from a client, and a characteristic word list is prepared from the document IDs and document information obtained in advance. Next, selected book IDs are obtained referring to the user ID and a user attribute table. On the basis of the obtained book IDs, unnecessary words are removed from the characteristic word list prepared by characteristic word list preparation program, and the characteristic word list from which the unnecessary words are removed is returned to the client as mining results.

4 Claims, 6 Drawing Sheets

1
211
212
212A
211A
MINING CONDITION INPUT PROGRAM
212B
COMMUNICATION PORT
CPU
MEMORY
MINING CONDITION TRANSMISSION PROGRAM
212C
213
CHARACTERISTIC WORD LIST RECEPTION PROGRAM
212D
211B
USER ATTRIBUTE REGISTRATION PROGRAM
232
232A
3
MINING CONDITION RECEPTION PROGRAM
231
231A
232B
DOCUMENT INFORMATION OBTAINING PROGRAM
2
232C
DOCUMENT INFORMATION
232D
UNNECESSARY WORD DICTIONARY LIST
232E
233
CHARACTERISTIC WORD LIST PREPARATION PROGRAM
232F
231B
UNNECESSARY WORD REMOVING PROGRAM
232G
CHARACTERISTIC WORD LIST TRANSMISSION PROGRAM
232H
USER ATTRIBUTE TABLE
DOCUMENT INFORMATION DATABASE
4

232C

| DOCUMENT ID (21) | AUTHOR (22) | TITLE (23) | TEXT (24) | PUBLICATION ID (25) |
|---|---|---|---|---|
| Text1 | Y. Morikawa | On about the bio infomatics | This study is ····· | Journal A |
| | M. hata | | | |
| | : | | | |
| Text2 | T. Mizunuma | The Cancer | ···· | Journal B |
| Text3 | J. Taniguchi | The survey of oncogene | ···· | Journal A |
| | K. Mitsuhara | | | |
| : | | : | : | : |

41 232D 42

| Journal A | Journal B | ······ | Journal Z |
|---|---|---|---|
| cell | Word_B1 | | Word_Z1 |
| protein | Word_B2 | | Word_Z2 |
| : | : | | : |
| : | : | ······ | : |
| : | : | | : |
| : | : | | : |
| : | : | | : |
| gene | Word_B100 | ······ | Word_Z100 |

101 232H 102

| USER ID | BOOK ID |
|---|---|
| USER A | Journal A |
| | Journal C |
| | Journal E |
| USER B | Journal A |
| USER C | Journal B |
| | Journal D |

TEXT MINING SERVER AND PROGRAM

CLAIM OF PRIORITY

The present application claims priority from Japanese application JP 2004-284601 filed on Sep. 29, 2004, the content of which is hereby incorporated by reference into this application.

BACKGROUND OF THE INVENTION

1. Field of the Invention

The present invention relates to a text mining server and a text mining program for automatically extracting characteristic words.

2. Background Art

Text mining is an effective means for obtaining significant information from a mass of document information. Among various methods of text mining, one effective method extracts characteristic words and makes a list of them. In this method, words are extracted from documents relative to inputted document IDs and weighted, and then words having high weight are listed as characteristic words. The weighting can be realized by using tf (Term Frequency) and idf (Inverse Document Frequency) as weight, for example. The tf and idf is a method in which when T(W) represents the total number of documents that include a word W, N represents the total number of documents, and F(W, Q) represents the frequency of appearance of the word W in a document Q, the level of importance of the word W in the document Q is defined by "F(W, Q)*Log[N/T(W)]". F(W, Q) corresponds to the tf, and Log[N/T(W)] corresponds to the idf.

The following is a flow of text mining where characteristic words are listed. Document IDs are transmitted from a client computer to a server computer. The server computer extracts characteristic words from document information that has the received document IDs using a characteristic word extraction program and the server computer obtains a characteristic word list. The characteristic word list is transmitted to the client computer, and the client computer receives the transmitted mining results and displays them, thereby ending mining. Documents relating to the text mining include the following Patent Document 1.

Patent Document 1: JP Patent Publication (Kokai) No. 2004-152035 A

SUMMARY OF THE INVENTION

The conventional text mining method above poses a problem in that "unnecessary words may be mixed in the characteristic word list, since however good an employed weighting algorithm may be, a criterion for words regarded as unnecessary (unnecessary words) differs depending on observers".

It is an object of the present invention to provide a text mining method by which the aforementioned problem of the conventional technique is reduced.

In order to achieve the aforementioned object, a text mining server of the present invention comprises mining condition accepting means for accepting mining conditions (one or a plurality of document IDs and a user ID), characteristic word list preparation means for extracting characteristic words from documents having the accepted document IDs and for preparing a characteristic word list, and means for obtaining an unnecessary word dictionary corresponding to the accepted user ID. The text mining server further comprises unnecessary word removing means for removing unnecessary words registered in the unnecessary word dictionary from the characteristic word list, and output means for outputting the characteristic word list as mining results from which the unnecessary words are removed via the unnecessary word removing means. The functions of the text mining server are realized by a computer program.

According to the present invention, by selecting book IDs, a user can certainly remove unnecessary words (words determined to be general words that frequently appear in the selected books) in advance from a prepared characteristic word list. Thus, it becomes possible to prepare a more highly accurate characteristic word list with less unnecessary words.

DESCRIPTION OF THE PREFERRED EMBODIMENTS

In the following, an embodiment of the present invention is concretely described with reference to the drawings.

Figure 1:
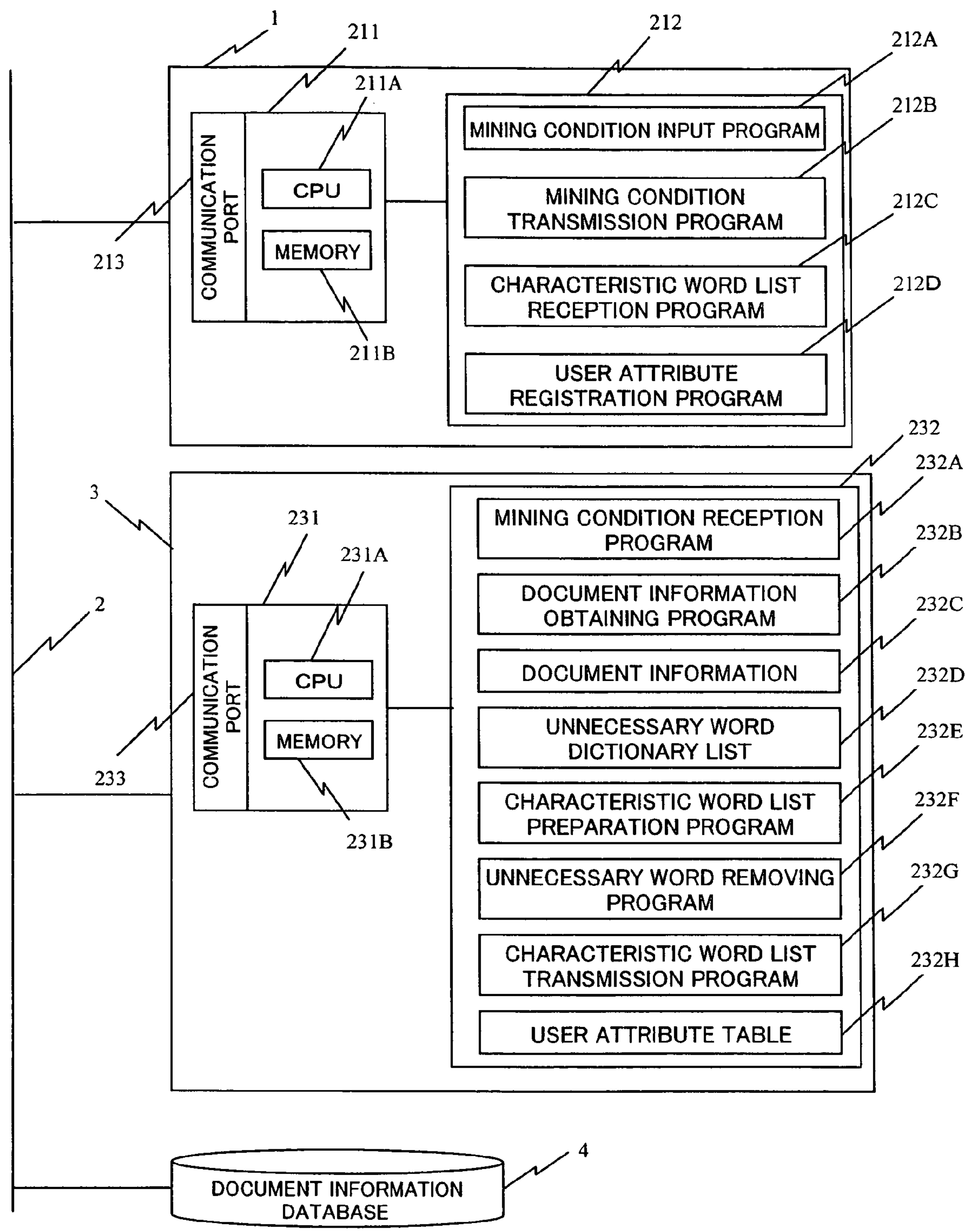
FIG. 1 shows a conceptual diagram of a text mining system according to the present invention.

FIG. 1 shows a conceptual diagram of a text mining system according to the present invention. The system shown in this case comprises a client computer 1 (hereafter simply referred to as a client) for inputting and transmitting mining conditions and receiving a prepared characteristic word list, a text mining server computer 3 (hereafter simply referred to as a server) for performing text mining, and a document information database 4 for holding document information. Each element is connected via a network 2.

The client 1 comprises a terminal device 211 provided with a CPU 211A and a memory 211B, a hard disk device 212 where a mining condition input program 212A, a mining condition transmission program 212B, a characteristic word list reception program 212C, and a user attribute registration program 212D are stored, and a communication port 213 for connecting to a network. In this case, mining conditions mean a plurality of document IDs as mining objects and a user ID. The server 3 comprises a terminal device 231 provided with a CPU 231A and a memory 231B, a hard disk device 232 to store a mining condition reception program 232A for receiving mining conditions transmitted from the client 1, a document information obtaining program 232B for obtaining the following document information 232C from the document information database 4, an unnecessary word dictionary list 232D as a set of unnecessary word dictionaries, a characteristic word list preparation program 232E for extracting characteristic words from documents having the document IDs specified in the mining conditions among the document information 232C, an unnecessary word removing program 232F for removing unnecessary words from the prepared characteristic word list, a characteristic word list transmission program 232G for transmitting the characteristic word list (where the unnecessary words have been removed) as mining results, and a user attribute table 232H where attribute information of a user is stored, and a communication port 233 for connecting to the network. The document information 232C is information of the document information database 4, and the information is stored in the server. In practice, information used for text mining is held locally in this manner from the database connected to the network. Also, methods for obtaining and preparing each unnecessary word dictionary included in the unnecessary word dictionary list 232D are arbitrary.

Figures 2, 3:
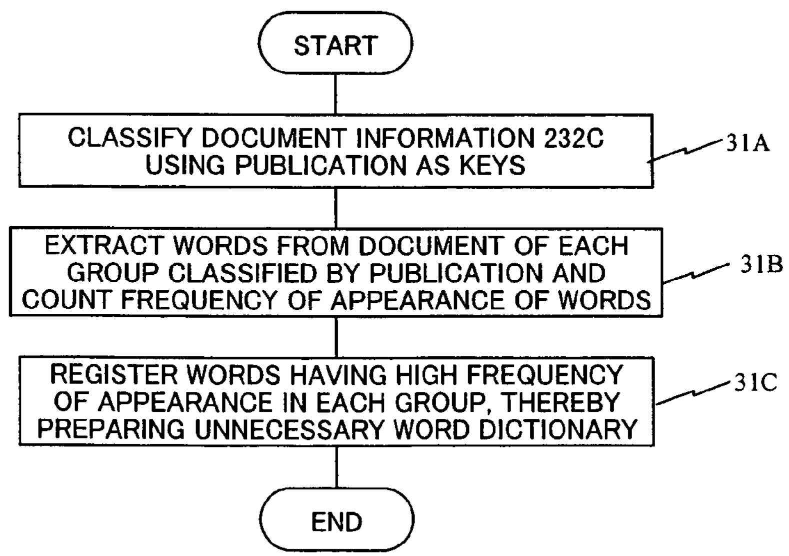
FIG. 2 shows an example of document information.
FIG. 3 shows an example of a flow chart when preparing an unnecessary word dictionary.

FIG. 2 shows an example of the document information 232C stored in the hard disk device 232 of the server 3. In the document information 232C, groups of document IDs 21, authors 22 of each document ID, titles 23, text 24, and publication IDs 25 are stored. In this case, the publication IDs indicate the IDs of books that carry object documents. In this example, although the authors, titles, text, and publication IDs are stored as document information, other information such as abstracts and published years, for example, may be stored as document information.

FIG. 3 shows an example of a flow chart indicating a method for preparing an unnecessary word dictionary constituting the unnecessary word dictionary list 232D stored in the hard disk device 232 of the server 3. In this example, the document information 232C is classified by the publication IDs and the unnecessary word dictionary is prepared by a method where words having a high frequency of appearance are registered as unnecessary words in each publication ID. In the preparation method, first, the document information 232C is grouped using the publication IDs as keys (step 31A). Then, words are extracted from the document of each group and the frequency of appearance of each word in the group is counted (step 31B). Finally, words having a high frequency of appearance in each group are registered, thereby preparing an unnecessary word dictionary (step 31C). The number of unnecessary words to be registered is 100, for example, consisting of words that have a high frequency of appearance.

The unnecessary word dictionary may be prepared by a method other than the method described in this case. For example, a personal unnecessary word dictionary may be built by successively registering unnecessary words found by each user through experience. The personal unnecessary word dictionary may be stored in a storage device of the server 3 or the unnecessary word dictionary may be held in the client 1 and transmitted to the server along with mining conditions upon transmission from the client 1 to the server 3.

Figures 4, 5:
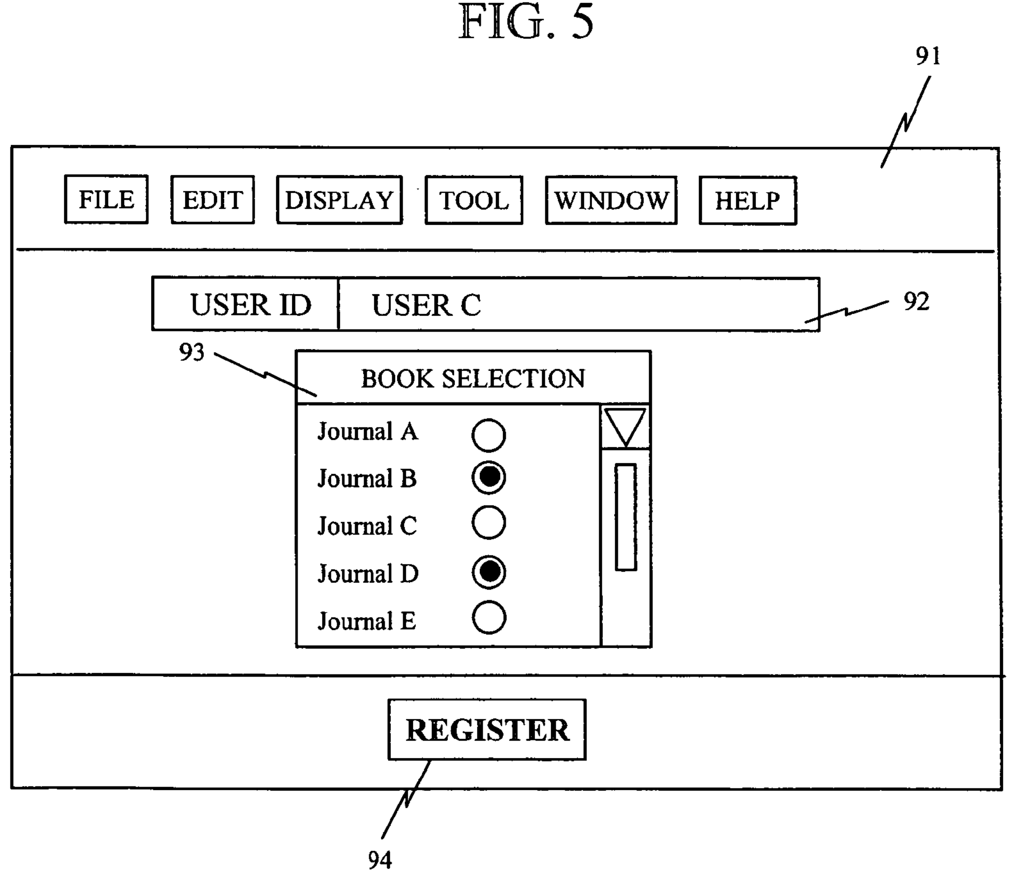
FIG. 4 shows an example of an unnecessary word dictionary list.
FIG. 5 shows an example of a screen of a user attribute registration program.

FIG. 4 shows an example of the unnecessary word dictionary list 232D stored in the hard disk device 232 of the server 3. The unnecessary word dictionary list comprises a plurality of unnecessary word dictionaries. Each unnecessary word dictionary includes a book ID 41 and an unnecessary word group 42.

FIG. 5 shows an example of the screen of the user attribute registration program 212D operating on the client 1. On the screen, a menu 91, a user ID input field 92 for inputting a user ID, a book selection field 93 for selecting book IDs, and a registration button 94 are displayed. In this case, the book IDs correspond to numeral 41 of FIG. 4 and a plurality of book IDs can be selected (words that frequently appear in the selected books are regarded as words known to a user, namely, unnecessary words and they are deleted from a characteristic word list prepared when mining is performed).

Figures 6, 7:
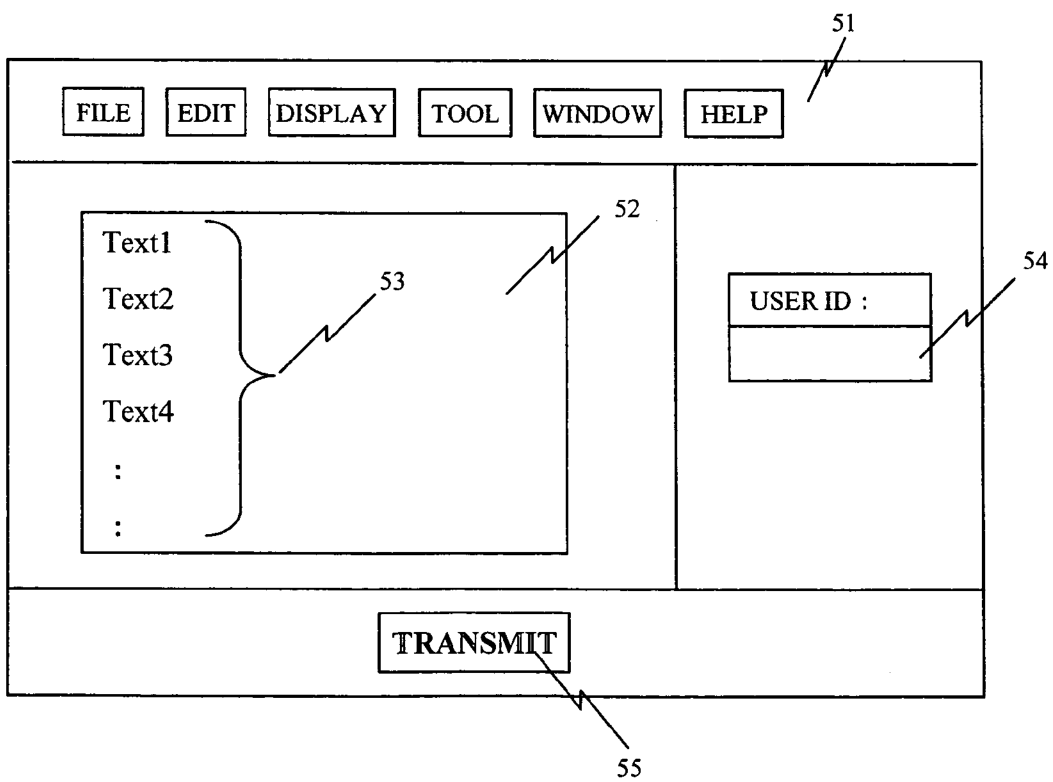
FIG. 6 shows an example of a user attribute table.
FIG. 7 shows an example of a screen of a mining condition input program.

FIG. 6 shows an example of the user attribute table 232H stored in the hard disk device 232 of the server 3. The user attribute table holds information of user IDs 101 and book IDs 102 selected by the users. User attribute information is added on the screen (FIG. 5) of the user attribute registration program 212D when attributes are selected and the registration button 94 is depressed.

FIG. 7 shows an example of the screen of the mining condition input program 212A operating on the client 1. On the screen, a menu 51, a document ID input field 52, a user ID input field 54 for inputting a user ID, and a transmission button 55 are displayed. By inputting document IDs (inputting is performed as numeral 53, for example. A plurality of IDs may be inputted) into the document ID input field 52 and depressing the transmission button 55, the mining condition transmission program 212B is started and the document IDs 53 and the user ID that have been inputted are transmitted to the text mining server 3.

Figure 8:
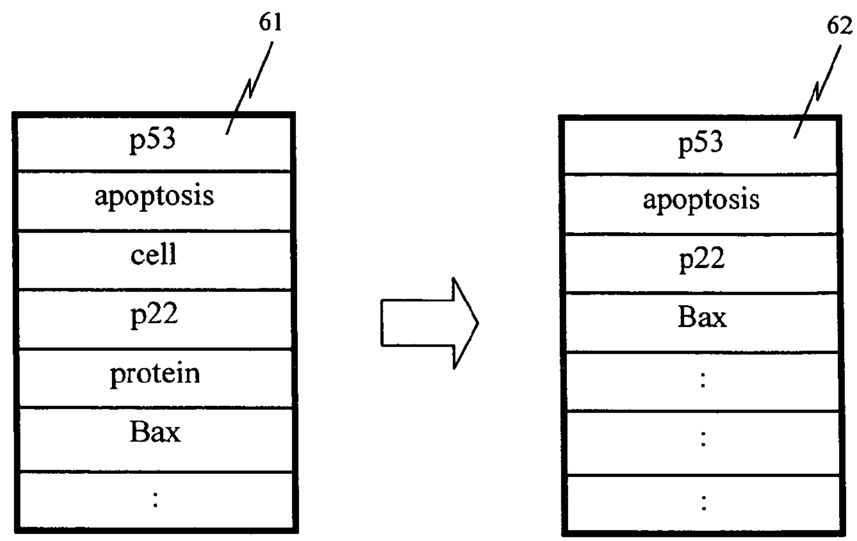
FIG. 8 shows an example where unnecessary words are removed from a characteristic word list via an unnecessary word removing program.

FIG. 8 shows an example where unnecessary words are removed from the characteristic word list using the unnecessary word dictionary. First, a characteristic word list 61 is prepared using a document that has a document ID specified by the user and the characteristic word list preparation program 232E. Next, the unnecessary word removing program 232F is started and a characteristic word list 62 from which unnecessary words are removed is prepared. In this example, user B selects Journal A as a book ID and an unnecessary word group included in Journal A of FIG. 4 is removed from the prepared characteristic word list 61. In this example, the words “cell” and “protein” are removed. If a plurality of book IDs are specified, all unnecessary word groups that belong to the book IDs specified in the unnecessary word dictionary list 232D become deletion objects.

Figure 9:
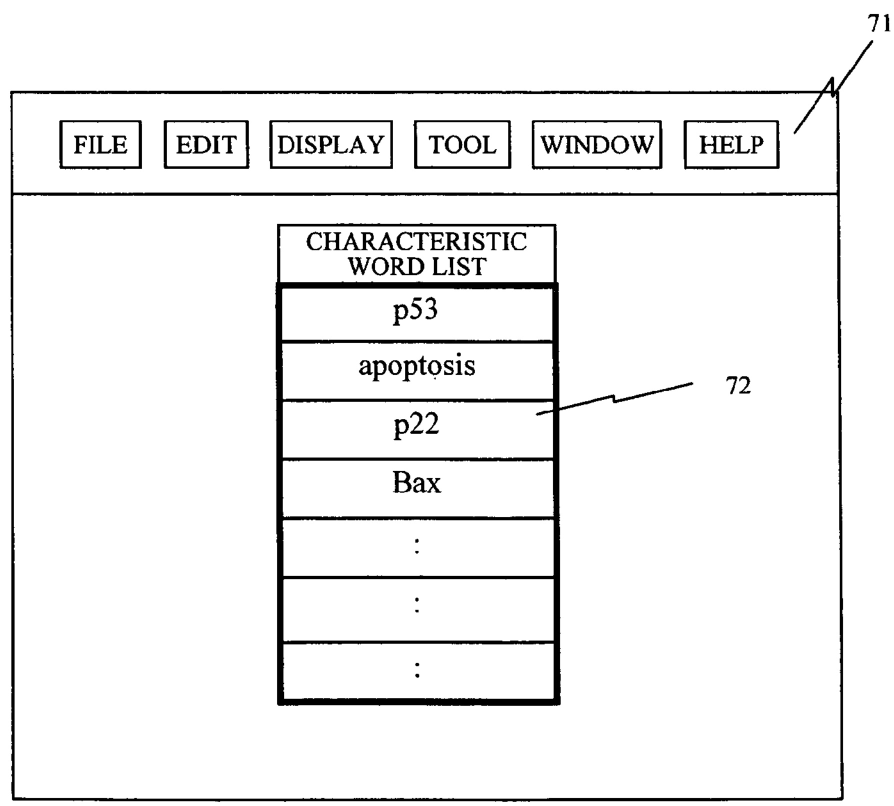
FIG. 9 shows an example of a screen of a characteristic word list reception program.

FIG. 9 shows an example of the screen of the characteristic word list reception program 212C operating on the client 1. On the screen, a menu 71 and a received characteristic word list 72 (unnecessary words are removed) are displayed.

Figure 10:
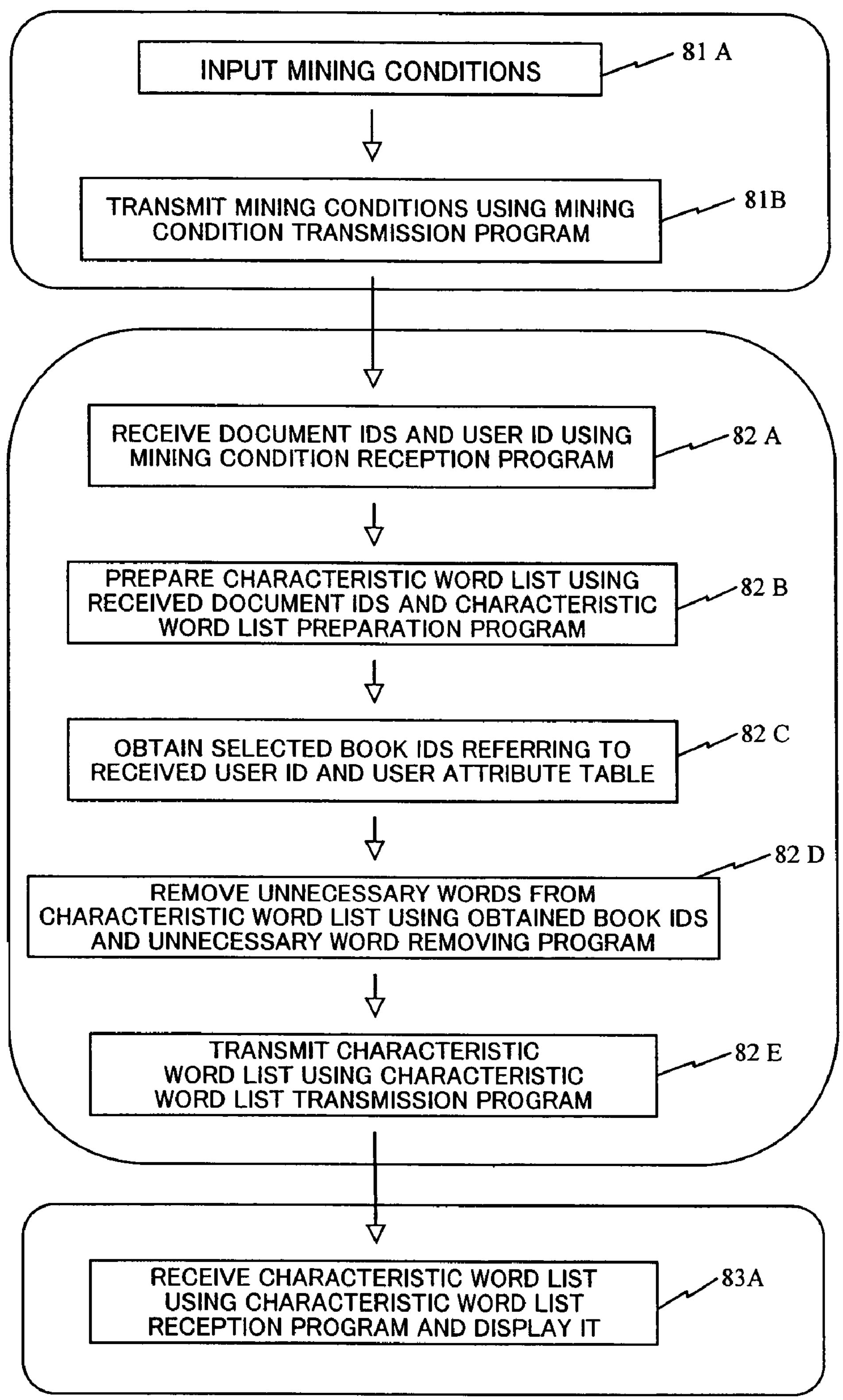
FIG. 10 shows a flow chart indicating the flow of text mining according to the present invention.

FIG. 10 shows a flow chart indicating the flow of text mining according to the present invention. Although the flow chart does not describe the fact, it is necessary to register user attribute information using a user attribute registration program in advance in order to perform mining.

Mining starts when a user inputs mining conditions (a plurality of document IDs and a user ID) on the client 1 (step 81A), and the mining conditions are transmitted to the server 3 (step 81B). The server 3 receives the inputted mining conditions (step 82A) and prepares a characteristic word list using document information that has the document IDs of the mining conditions and the characteristic word list preparation program (step 82B). Then, the server 3 obtains the selected book IDs referring to the user ID specified in the mining conditions and the user attribute table (82C). Unnecessary words are removed from the characteristic word list using the obtained book IDs and the unnecessary word removing program (step 82D). Finally, the characteristic word list from which the unnecessary words are removed is transmitted to the client 1 using the characteristic word list transmission program (step 82E). The client 1 receives the characteristic word list from which the unnecessary words are removed and displays it (step 83A), thereby ending the mining.

What is claimed is:

1. A text mining server comprising:

mining condition accepting means for accepting one or a plurality of document IDs and a user ID as mining conditions;

characteristic word list preparation means for extracting characteristic words from one or a plurality of documents corresponding to the accepted document IDs and for preparing a characteristic word list;

means for obtaining an unnecessary word dictionary corresponding to the accepted user ID;

unnecessary word removing means for removing unnecessary words registered in the unnecessary word dictionary from the characteristic word list; and output means for storing and outputting the characteristic word list as mining results from which the unnecessary words are removed via the unnecessary word removing means.

2. The text mining server according to claim 1, wherein the means for obtaining an unnecessary word dictionary obtains words having a high frequency of appearance in a document specified via the accepted user ID as unnecessary words.

3. The text mining server according to claim 1, wherein the mining condition accepting means receives the mining conditions from a client computer and the output means transmits the characteristic word list from which the unnecessary words are removed to the client computer.

4. A text mining system for enabling a computer to perform text mining, comprising:

mining condition accepting means for accepting one or a plurality of document IDs and a user ID as mining conditions;

characteristic word list preparation means for extracting characteristic words from one or a plurality of documents corresponding to the accepted document IDs and for preparing a characteristic word list;

means for obtaining an unnecessary word dictionary corresponding to the accepted user ID;

unnecessary word removing means for removing unnecessary words registered in the unnecessary word dictionary from the characteristic word list; and output means for storing and outputting the characteristic word list as mining results from which the unnecessary words are removed via the unnecessary word removing means for performing text mining.

* * * * *